US012738705B2

(12) United States Patent
Geusch

(10) Patent No.: US 12,738,705 B2
(45) Date of Patent: Sep. 15, 2026

(54) TWO-PART CONTACT ELEMENT FOR ELECTRICAL PLUG CONNECTIONS AND METHOD FOR PRODUCING A CONTACT ELEMENT OF THIS TYPE

(71) Applicant: HARTING Electric Stiftung & Co. KG, Espelkamp (DE)

(72) Inventor: Wolfgang Geusch, Rahden (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 321 days.

(21) Appl. No.: 18/716,239

(22) PCT Filed: Dec. 9, 2022

(86) PCT No.: PCT/DE2022/100931
§ 371 (c)(1),
(2) Date: Jun. 4, 2024

(87) PCT Pub. No.: WO2023/110017
PCT Pub. Date: Jun. 22, 2023

(65) Prior Publication Data
US 2025/0047050 A1 Feb. 6, 2025

(30) Foreign Application Priority Data
Dec. 14, 2021 (DE) ..................... 10 2021 132 990.6

(51) Int. Cl.
*H01R 43/16* (2006.01)
*H01R 4/18* (2006.01)
(Continued)

(52) U.S. Cl.
CPC ............. *H01R 43/16* (2013.01); *H01R 4/185* (2013.01); *H01R 13/03* (2013.01); *H01R 13/04* (2013.01); *H01R 13/10* (2013.01)

(58) Field of Classification Search
CPC ........ H01R 43/16; H01R 4/185; H01R 13/03; H01R 13/04; H01R 13/10
See application file for complete search history.

(56) References Cited

U.S. PATENT DOCUMENTS

2013/0052888 A1 2/2013 Wolting et al.
2017/0012399 A1 1/2017 Garske et al.
(Continued)

FOREIGN PATENT DOCUMENTS

DE 19922560 A1 11/2000
DE 10005297 A1 8/2001
(Continued)

OTHER PUBLICATIONS

Machine Translation EP 0106992 A1, dated (May 2, 1984) (Year: 2026).*

*Primary Examiner* — Travis S Chambers
(74) *Attorney, Agent, or Firm* — Smartpat PLC

(57) ABSTRACT

An electrical contact element consists of two different parts. A conductor connection part and a contact part are mechanically and electrically connected to one another. The conductor connection part is a stamped-bent part and provided for crimping onto an electrical conductor. The contact part is a turned part produced from solid material and configured as a pin or socket part. The contact part is provided with an axial, concentric hole at the end directed towards the connection part. The conductor connection part has a conductor connection region that is open and has a substantially U-shaped cross-section and has a folded joining region at the end facing the contact part. The joining region of the conductor connection part is arranged in the hole of the contact part and fixed in same by compression.

20 Claims, 2 Drawing Sheets

(51) Int. Cl.

| | |
|---|---|
| ***H01R 13/03*** | (2006.01) |
| ***H01R 13/04*** | (2006.01) |
| ***H01R 13/10*** | (2006.01) |

(56) References Cited

U.S. PATENT DOCUMENTS

| | | | | |
|---|---|---|---|---|
| 2017/0062967 | A1 | 3/2017 | Wittmann | |
| 2017/0194722 | A1 | 7/2017 | Naganishi et al. | |
| 2025/0141121 | A1* | 5/2025 | Baltruschat ............ | H01R 43/16 |

FOREIGN PATENT DOCUMENTS

| | | | | | |
|---|---|---|---|---|---|
| DE | 102007026707 | | | 9/2008 | |
| DE | 102010020346 | A1 | | 11/2011 | |
| DE | 112015004383 | | | 6/2017 | |
| DE | 202018104958 | U1 | | 9/2018 | |
| EP | 0106992 | A1 | | 5/1984 | |
| EP | 3123574 | A1 | | 2/2017 | |
| EP | 3140883 | A1 | | 3/2017 | |
| WO | WO-0014828 | A1 | * | 3/2000 | ........... H01R 13/187 |

* cited by examiner

TWO-PART CONTACT ELEMENT FOR ELECTRICAL PLUG CONNECTIONS AND METHOD FOR PRODUCING A CONTACT ELEMENT OF THIS TYPE

CROSS-REFERENCE TO RELATED APPLICATION

This application is a national stage application, filed under 35 U.S.C. § 371, of International Patent Application PCT/DE2022/100931, filed on Dec. 9, 2022, which claims the benefit of German Patent Application DE 10 2021 132 990.6, filed on Dec. 14, 2021.

BACKGROUND

Contact elements are required in order to produce an electrical connection between an electrical conductor, in particular a stranded conductor, and a terminal end of a pin or socket contact.

Contact elements are contacted for the purpose of transmitting electrical currents or electrical power to a suitable mating contact element. The contact elements are used, for example, in plug connectors but can also be installed on so-called busbars. Such plug connectors and mating plug connectors are used in order to produce an electrical and mechanical connection between two electrical lines or an electrical line and an appliance, in particular in an industrial context.

It is known from DE 10 2010 020 346 A1 to produce such contact elements as turned parts in the form of solid contacts. These contacts are made from solid material and, because of the high degree of precision in the production of turned parts, have good guidance and positioning properties during use in the insulating housing. Such contact elements moreover have a high current carrying capacity compared with stamped and bent contact elements of approximately the same size and made from the same material.

A solid-material contact element is characterized by a guide region which is to be produced extremely precisely. In particular, in the case of such a socket contact element, it is possible without the use of particularly complex measures to provide the insertion region for a pin contact element with a closed annular input region. However, the processing of such contact elements is relatively complex for the user because the contact elements are produced as individual contact elements and particular precautions have to be taken for the automatic processing. Thus, the contact elements generally have to be laboriously inserted beforehand into a processing belt which is then supplied to a machine. This is shown, for example, in EP 3 123 574 B1.

EP 3 140 883 B1 shows a contact element which is produced in a stamping and bending method. Such contact elements can be produced very cost-effectively. However, the so-called stamped and bent contact elements have a higher manufacturing tolerance such that errors can occur during processing by machine. The field of use of such contact elements is moreover restricted by a low current carrying capacity compared with their size.

EP 0 106 992 A1 shows a contact element which is composed of different constituent parts. The contact region is configured as a so-called turned part and thus as solid and is provided in particular for positioning with a precise fit in predetermined receiving openings of an insulating housing. The terminal region is here designed for crimping onto an electrical conductor with a U-shaped cross-section and configured as a stamped and bent part. These functional constituent parts of the contact element are electrically and mechanically connected via a pin-shaped clamping part in the region of which so-called mechanical molding takes place.

The German Patent and Trademark Office has conducted a search in the priority application and found the following prior art for the present application: DE 10 2007 026 707 B3, DE 100 05 297 A1, DE 199 22 560 A1, DE 20 2018 104 958 U1, DE 11 2015 004 383 T5, EP 3 123 574 B1, EP 3 140 883 B1, and EP 0 106 992 A1.

SUMMARY

The disclosure describes a contact element which has good electrical properties, can be produced favorably, and can be processed simply, in particular by a machine.

The is achieved by the respective subjects of the independent claims.

Advantageous embodiments of the invention are specified in the dependent claims and the following description.

The electrical contact element consists of two different parts, wherein the two parts are mechanically and electrically connected to each other. The parts are a conductor terminal part and a contact part.

The conductor terminal part is preferably formed from brass or a brass plate, whilst the contact part is produced from an extruded material, consisting of copper or a copper alloy, and additionally is advantageously covered with a stainless metal plating. The stainless metal is preferably silver, a silver alloy, gold, or a gold alloy.

A first part is a conductor terminal part which is stamped from a metal sheet in a stamping and bending method. The conductor terminal part is provided for crimping onto an electrical conductor. The stripped end of the conductor is squeezed onto a conductor terminal region of the conductor terminal part during the crimping. The terminal part furthermore has an open conductor terminal region which has an essentially U-shaped cross-section. The conductor terminal part has a joining region at its end facing the contact part.

The joining region is formed from two flat tabs, situated opposite each other, which are each folded or spirally coiled or rolled and then pressed against each other or compressed. A crease or a groove is formed in the region in which the coiled tabs are pressed against each other. A joining region filled with the same material is consequently formed. No foreign material or additional component is required in order to fill the joining region with material, which is a requirement for a subsequent compression procedure.

The joining region of the conductor terminal part preferably has an essentially cylindrical form. The volume of the cylinder is here filled with material up to at least 60%, preferably even up to at least 80%.

A second part is a contact part which is produced from solid material in a turning method and possibly further machining method steps. The contact part can be configured as a pin or socket part. The contact part has an axial essentially concentric bore at its end directed toward the terminal part.

The joining region of the conductor terminal part is arranged in the bore of the contact part. The conductor terminal part and the contact part are ultimately fixed to each other by compressing the outer region of the bore. The joining region is not designed as hollow cylindrical and instead as filled so that it is inherently solid or with the same material. The cross-section of the joining region of the conductor terminal part is configured as pretzel-shaped. As a result, a particularly stable mechanical connection between the conductor terminal part and the contact part can be implemented.

The contact element is preferably formed from precisely two different parts. This means that no further parts are required in order to mechanically and electrically connect the two functional parts, the conductor terminal part and the contact part, to each other.

The conductor terminal part is a stamped and bent part formed from sheet metal material and is equipped at the terminal side with a conductor terminal region which is laterally open and has a U-shaped cross-section. The conductor terminal part has a joining region with an axial groove at its end facing the contact part. The groove is formed by the abutting coiled or folded tabs which are described in detail above.

The coiled and/or rolled and/or folded tabs are preferably pressed against each other resiliently. This means that, when pressed together, they exert an outward force and, when inserted into the axial bore of the contact part, they apply a retaining force.

The U-shaped conductor terminal region has a first subregion for being squeezed, or crimped, onto the conductor stripped at its end, and a second subregion for grasping a still insulated conductor region. The latter serves in particular for the strain relief of the system consisting of the conductor and the contact element.

The region in which the joining region of the conductor terminal part projects into the axial bore of the contact part, i.e. the region where an overlap of the two parts takes place, is referred to as the connecting region. An indentation (also called a crease) is preferably provided on the outside of the connecting region. The two parts are firmly mechanically connected to each other because of this. The connection is stable such that it withstands processing of the contact elements by a machine.

A contact element is produced according to the following method steps:

a) First, conductor terminal parts are stamped from a strip of sheet metal, wherein individual conductor terminal parts remain joined together on a connecting strip.

b) Next, a joining region is formed at the stamped-out conductor terminal part by two tabs protruding on either side being reshaped in each case as spirals (by folding or rolling of the material) and then pressed against each other. Two further pairs of tabs situated opposite each other are moreover bent upward in a bending procedure (shaping procedure) and a conductor terminal region consequently formed.

c) Next, the joining region is pushed into an axial bore of a contact part produced in the turning method. The turned part is produced in a separate upstream manufacturing method which is not described in detail in this application.

d) Next, the outside of the contact part is squeezed (compressed) in the region of the bore and to be precise at the level at which the joining region of the conductor terminal part is situated inside the bore. Mechanical fixing of the conductor terminal part and the contact part which is suitable for industrial use is implemented as a result.

b') The spirally coiled or rolled tabs can, in particular because they are pressed against each other, exert a spring force.

c') When the joining region of the conductor terminal part is pushed into the axial bore, provided for this purpose, of the contact part, an outwardly directed force then on the bore wall via the coiled or rolled tabs such that a clamping force is created between the two parts. The subsequent compression procedure is facilitated because of this as the parts are reliably held in position.

In order to further increase the retaining forces between the two parts (the conductor terminal part and the contact part), a form-fitting connection is also provided in addition to the essentially force-fitting connection of the two parts. This is achieved by the above-described compression.

BRIEF DESCRIPTION OF THE DRAWINGS

An exemplary embodiment of the two-part contact element is illustrated in the drawings and explained in detail below.

DETAILED DESCRIPTION

The figures contain partially simplified schematic illustrations. Identical reference signs are used in part for the same but possibly non-identical elements. Different views of the same elements could be to a different scale. Specified directions such as, for example, “left”, “right”, “up”, and “down” are to be understood with reference to the respective figure and can vary in the individual illustrations with respect to the object illustrated.

Figure 1:
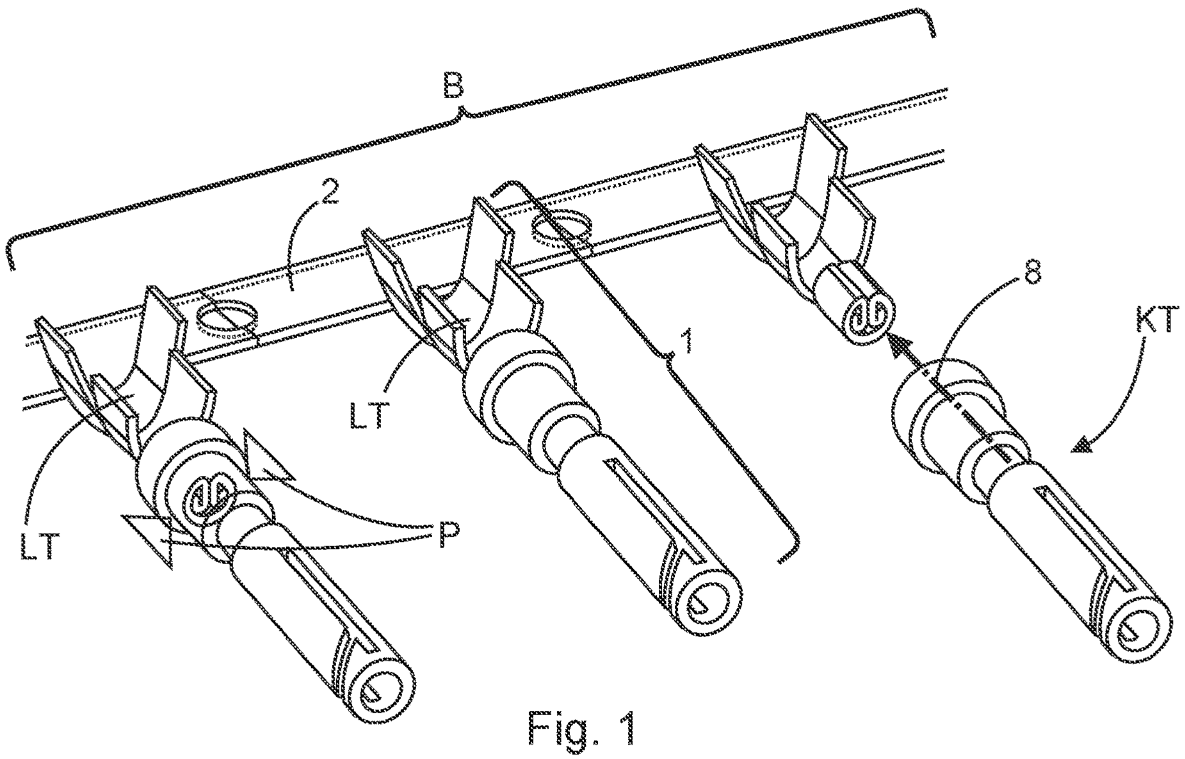
FIG. 1 shows a perspective illustration of a strip of contact elements arranged in a row.

FIG. 1 shows a contact element 1 according to the invention which is formed from a conductor terminal part LT and a contact part KT. The conductor terminal part is preferably formed from brass, whilst the contact part is made from copper or a copper alloy and additionally is advantageously galvanically covered with a stainless metal plating. The stainless metal is preferably silver, a silver alloy, gold, or a gold alloy.

Figure 2:
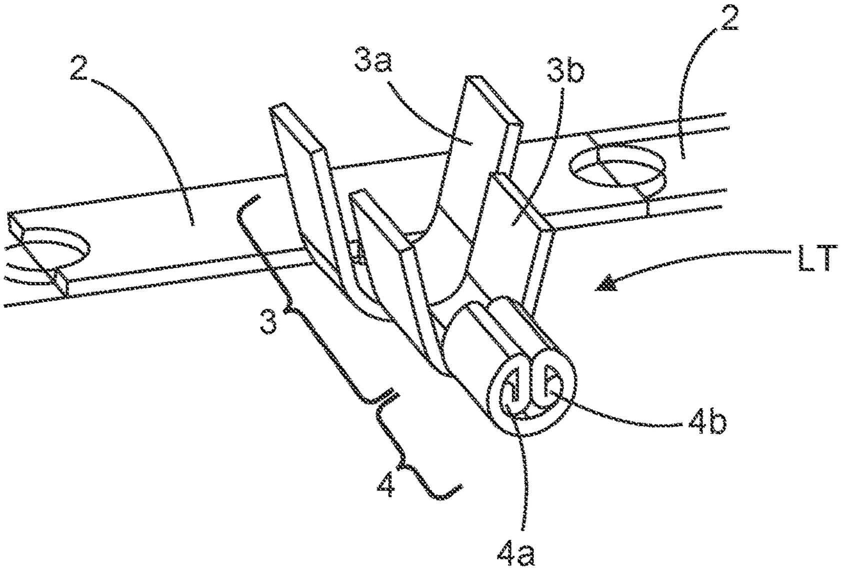
FIG. 2 shows a perspective illustration of a conductor terminal part of the contact element.

The conductor terminal part LT is illustrated separately in perspective in FIG. 2. The conductor terminal part LT is made from a stamped-out sheet metal piece and is brought into the shape shown in FIG. 2 in a stamping and bending method. When stamped out, the individual conductor terminal parts remain joined to each other by a connecting strip 2 remaining on the material. A strip B is created as a result which can be processed by a machine after the individual contact elements 1 have been completed.

The conductor terminal part LT has a conductor terminal region 3 on the terminal side. The conductor terminal region 3 has a first subregion **3*a* for squeezing a stripped region of the conductor (not shown). The term crimping is used instead of the word squeezing. An electrical connection between the conductor and the contact element 1 is produced as a result. The conductor terminal region 3 has a second subregion 3*b* for grasping an insulated region of the conductor (not shown). The second subregion 3*b*** serves especially for the strain relief of the electrical connection.

The conductor terminal part LT has a joining region 4 at its end facing the contact part KT. The joining region 4 is formed from two stamped-out tabs **4*a*, 4*b*** which are situated opposite each other and are folded against each other and then brought into an essentially cylindrical form with at least one die. Preferably, two dies are used for the shaping. A first die gives the tabs a rough cylindrical shape. The second die, also called a calibration tool, finally presses the tabs into a precise final shape.

In other words joining region 4, the joining region consists of a cylinder which is filled with the same existing material and, by means of a folding procedure with a subsequent calibration process, is given the dimensional accuracy for fitting the contact of the contact part KT.

Figure 3:
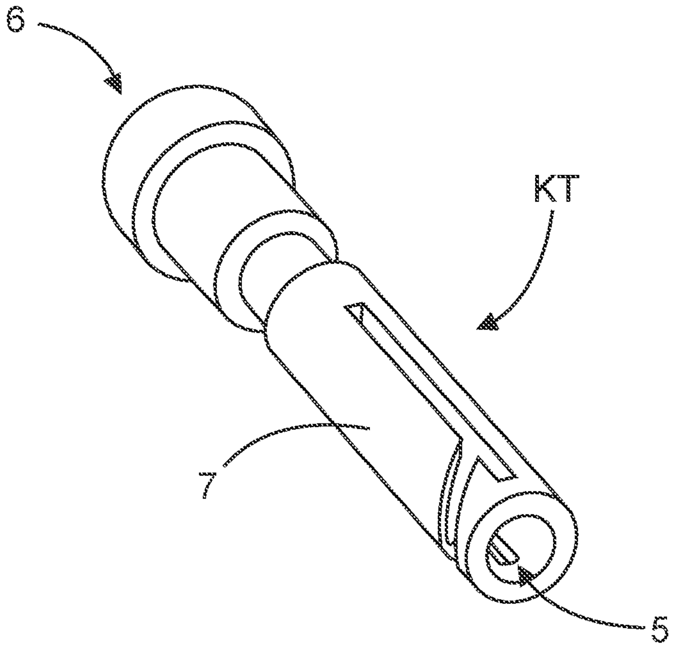
FIG. 3 shows a perspective illustration of a contact part, in the form of a socket part, of the contact element.

A first contact part KT according to the invention is illustrated in FIG. 3. This is here a so-called socket contact part which has been produced from a solid extruded material in a turning method. Further machining steps as well as bores may have been applied to complete it.

On the contact side, the socket contact part KT has an insertion opening 5 for receiving a suitable pin contact element (not shown). For the purpose of better electrical contacting of the pin contact element, the socket region of the socket contact element KT has a contact tab 7 which is pressed radially inward. The contact part KT has an axial concentric bore 6 at its end directed toward the terminal part.

Figure 4:
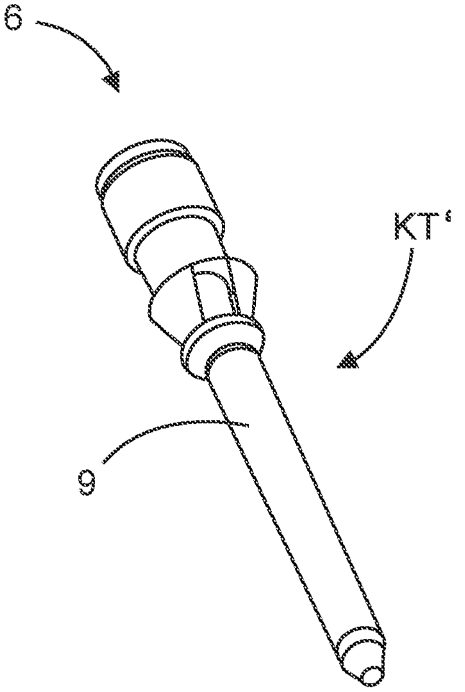
FIG. 4 shows a perspective illustration of a contact part, in the form of a pin part, of the contact element.

A second contact part KT' according to the invention is illustrated in FIG. 4. Here it is a so-called pin contact part which has been produced from a solid extruded material in a turning method. Further machining steps as well as bores may have been applied to complete it.

On the contact side, the pin contact part KT' has a pin 9 for plugging into a suitable socket contact element (not shown). The contact part KT' has an axial concentric bore 6 at its end directed toward the terminal part.

The conductor terminal part LT has a joining region 4 an end facing the contact part KT. It can be seen in FIG. 1 that the joining region 4 is pushed into the bore 6 of the contact part KT. This is symbolized by the arrow 8 in FIG. 1. The joining region 4 is afterwards arranged in the bore 6. Molding, by means of which the mechanical and electrical connection of the two parts of the contact element is completed, takes place in a compression region P which is demarcated by two triangles.

LIST OF REFERENCE SIGNS

1 contact element
2 connecting strip
3 conductor terminal region
3*a*) first subregion
3*b*) second subregion
4 joining region
4*a*) tab
4*b*) tab
5 insertion opening
6 bore
7 contact tab
8 arrow
9 pin
LT conductor terminal part
KT contact part
B strip
P compression region

The invention claimed is:

1. An electrical contact element (1), comprising:
a conductor terminal part (LT); and
a contact part (KT, KT'),
wherein the conductor terminal part (LT) and the contact part (KT, KT') are different parts,
wherein the conductor terminal part (LT) and the contact part (KT, KT') are mechanically and electrically connected to each other,
wherein the conductor terminal part (LT) is a stamped and bent part and is provided for crimping onto an electrical conductor, and
wherein the contact part (KT, KT') is a turned part produced from solid material and is configured as a pin or socket part,
wherein the contact part (KT, KT') has a bore (6) that is axial essentially concentric at an end directed toward the conductor terminal part,
wherein the conductor terminal part (LT) has an open conductor terminal region (3) which has an essentially U-shaped cross-section, and a folded joining region (4) at an end facing the contact part (KT, KT'), and
wherein the folded joining region (4) of the conductor terminal part (LT) is arranged in the bore (6) of the contact part (KT, KT') and is fixed therein by compression.

2. The electrical contact element (1) as claimed in claim 1,
wherein the folded joining region (4) is formed from two stamped-out tabs (4*a*, 4*b*), situated opposite each other, which are first folded against each other and then given an essentially cylindrical form with at least one die.

3. The electrical contact element (1) as claimed in claim 2,
wherein the two stamped-out tabs (4*a*, 4*b*) exert a radially directed spring force in the bore (6).

4. The electrical contact element (1) as claimed in claim 1,
wherein the folded joining region (4) is filled at least partially with a same material.

5. The electrical contact element (1) as claimed in claim 1,
wherein the folded joining region (4) has an essentially cylindrical form, and
wherein a volume of the essentially cylindrical form is at least 60% filled with material.

6. The electrical contact element (1) as claimed in claim 1,
wherein the folded joining region (4) has an essentially cylindrical form, and
wherein a volume of the essentially cylindrical form is at least 80% filled with material.

7. The electrical contact element (1) as claimed in claim 1,
wherein the electrical contact element (1) consists of precisely two different parts (LT, KT).

8. The electrical contact element (1) as claimed in claim 1,
wherein the folded joining region (4) of the conductor terminal part (LT) is pressed into the bore (6) of the contact part (KT, KT').

9. The electrical contact element (1) as claimed in claim 1,
wherein the folded joining region (4) of the conductor terminal part (LT) has a pretzel-shaped cross-section.

10. The electrical contact element (1) as claimed in claim 1,
wherein the open conductor terminal region (3) has
a first subregion (3*a*) for grasping an insulated region of the electrical conductor, and
a second subregion (3*b*) for crimping a stripped region of the electrical conductor.

11. The electrical contact element (1) as claimed in claim 1,
wherein the open conductor terminal region (3) of the conductor terminal part (LT) has a tin plating.

12. The electrical contact element (1) as claimed in claim 1, wherein an overlap of the conductor terminal part (LT) and the contact part (KT, KT') forms a connecting region and wherein an indentation is provided on an outside of the connecting region.

13. The electrical contact element (1) as claimed in claim 1, wherein the conductor terminal part (LT) is formed from brass.

14. The electrical contact element (1) as claimed in claim 1, wherein the contact part (KT, KT') is made from copper or a copper alloy.

15. The electrical contact element (1) as claimed in claim 14, wherein the contact part (KT, KT') is provided with a galvanic plating, and wherein the galvanic plating is silver, a silver alloy, gold, or a gold alloy.

16. A strip product, comprising a plurality of contact elements (1) in a row and each connected to one another via a metal connecting strip (2), wherein each of the plurality of contact elements (1) is configured as claimed in claim 1.

17. The strip product as claimed in claim 16, wherein the strip product is configured as a reel and has more than two thousand contact elements (1).

18. A method for producing a contact element (1) capable of being processed as a strip product, the method comprising, a) stamping a conductor terminal part (LT) from a strip of sheet metal, wherein individual conductor terminal parts (LT) remain joined together on a connecting strip (2), b) forming a joining region (4) by folding two tabs (4*a*, 4*b*) against each other and then giving the two tabs (4*a*, 4*b*) an essentially cylindrical form with a die, c) inserting the joining region (4) into an axial bore (6) of a contact part (KT, KT') produced in a turning method, d) compressing an outside of the contact part (KT, KT') in a region of the axial bore and thereby mechanically fixing the conductor terminal part (LT) and the contact part (KT, KT').

19. The method as claimed in claim 18, further comprising b') after folding, pressing the two tabs (4*a*, 4*b*) situated opposite each other by a first die into a rough preform and are then pressing the two tabs (4*a*, 4*b*) into a precise final form by a second die.

20. The method as claimed in claim 18, further comprising c') producing the contact part (KT, KT') in an upstream turning method and then providing the contact part (KT, KT') with a galvanic stainless metal plating.

* * * * *